United States Patent Office 3,487,773
Patented Jan. 6, 1970

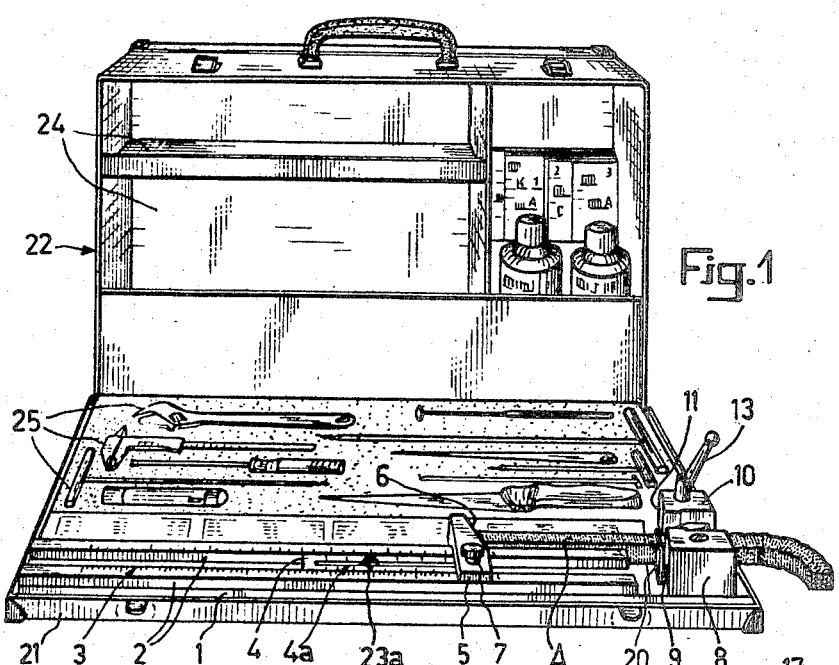
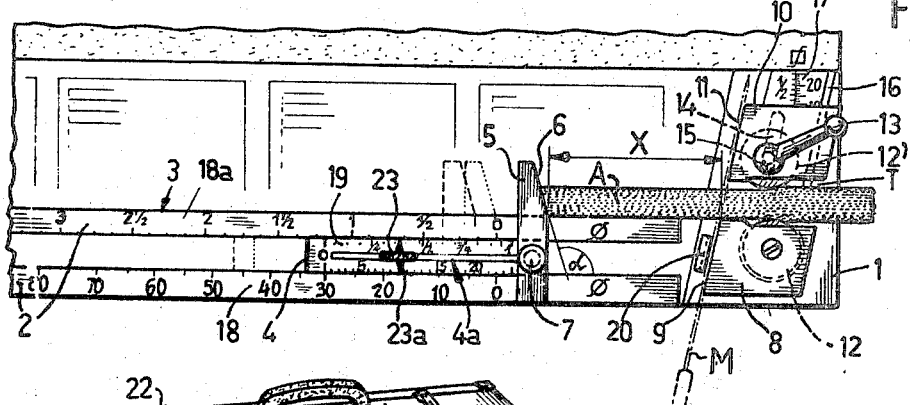
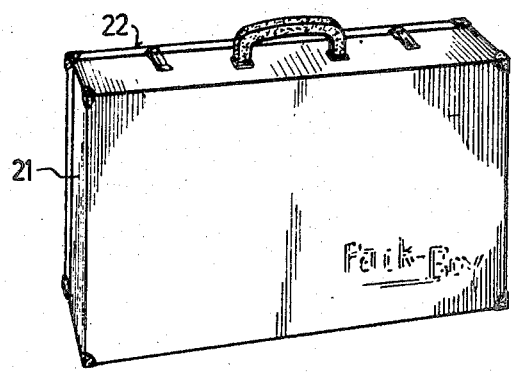

3,487,773
DEVICE FOR PRODUCING PACKING STRIPS OF CORRECT LENGTH FOR STUFFING BOXES
Jakob Meier, Azmoos, Switzerland, assignor, by mesne assignments, to Technova AG Aarau, Aarau, Switzerland
Filed Dec. 12, 1967, Ser. No. 689,830
Claims priority, application Switzerland, Dec. 15, 1966, 18,061/66
Int. Cl. B30b *3/04, 15/00;* B26d *7/16*
U.S. Cl. 100—94                                 13 Claims

ABSTRACT OF THE DISCLOSURE

A stop surface in cooperation with two scales permits cutting, with the aid of a knife, packing strip to the correct length which compensates for the thickness of the strip. A pair of rollers reduces the strip thickness by approximately 10%, so that the packing can be properly inserted in the stuffing box.

BACKGROUND OF THE INVENTION

The invention relates to a device for cutting correctly to length packing, square in cross section, for stuffing boxes.

Stuffing-box packing for moving parts, such as shafts, axles, spindles, and rods, requires a suitable sealing material, which usually is intertwined together to form a strip that is square in cross section. The strip, which is available on reels in various cross-sectional sizes, must be cut to the correct length, bent into a ring with ends touching, and then fitted (in the case of a shaft) into the clearance between shaft and bore. The rate of wear of the packing and of the shaft (or other movable part) is chiefly dependent on the correct length and shape of the ring before it is fitted. If the seal becomes less good, this must be compensated by resetting the gland, which increases the rate of wear.

With lubricant-treated packings, and particularly with modern packings made partly or entirely of synthetic materials, the ends must close together well and the packing have a cross section of the correct size, if the seal is to function properly.

Hitherto, packing rings for shafts are made by choosing from a reel the sealing strip having a suitable thickness, rolling down the thickness until it is exactly equal to the clearance between shaft and bore, then winding about the shaft a definite length of the worked strip, and finally cutting off the required number of turns with a knife. This procedure entails many steps, is inexact, and in practice produce an unsuitable V-shaped opening between the square-cut strip ends, which leads to the increased wear noted above. But the chief defect of these packing rings is that they lack the necessary extra length before they are fitted into the stuffing box, which extra length depends on the strip thickness, and which together with an approximately 10% reduction in the strip thickness enable the ring to be properly fitted into the stuffing box and ensures a satisfactory seal. This drawback could be remedied by manufacturing ready-to-use packing rings for every shaft diameter and strip thickness. However, manufacturing, packing, purchasing, and inventory problems militate against this solution.

When fresh packing must be inserted in a stuffing box, or similar shaft-sealing arrangement, the maintenance man should be able to make, on the spot and in a simple sequence of steps, one or more packing rings which are correctly dimensioned in all of their parts. The following points are important:

(1) A correctly proportioned extra length of the strip;
(2) Correctly cut ends of the strip; and an
(3) Approximately 10% reduction in the thickness of the strip.

SUMMARY OF THE INVENTION

The device of the invention produces strips which meet these three points and from which, therefore, satisfactory packing rings can be made.

An object of the invention is a device for cutting off packing strips to be made into packing rings, the length of which strips is dependent on the strip thickness as well as on the shaft circumference; the thickness of which strips is suitably reduced so that when they are bent into rings, the latter can be easily fitted into the clearance, where they provide a reliable and effective seal; and the ends of which strips are obliquely cut.

This object and other objects of the invention will be apparent from the following detailed description of the invention.

BRIEF DESCRIPTION OF THE DRAWING

The invention is described with reference to the figures of the accompanying drawing, wherein:
FIG. 1 is a perspective view of the invention built into a maintenance case;
FIG. 2 is a top view of the invention; and
FIG. 3 is a perspective view of the closed maintenance case.

DESCRIPTION OF THE PREFERRED EMBODIMENT

Two spaced, parallel guide rails 2, forming between them a track 3 in which a slider 4 slides, are mounted on a support plate 1. The upper rail 2 (as seen in FIG. 2) defines a pathway for the sealing strip A. The slider carries a stop member 5 incorporating an oblique stop surface 6 which makes an angle $\alpha$ of approximately 101° with the track 3. A set screw 7 serves to hold the slider 4 in place. An index mark 23, advantageously colored and incorporating a pointer 23a, slides in a slot 4a of the slider 4, and facilitates setting the latter. A housing 8 is rigidly mounted on the plate 1 and incorporates an oblique face 9 which forms an angle of approximately 101° with the track 3, as the mirror image of the angle made by surface 6, and which face extends perpendicular to the surface of plate 1. Although the housing 8 is shown in FIGS. 1 and 3 as a separate part, the rails 2 and housing 8 can be manufactured as a single, integral unit. A second housing 10, adjustable in position, incorporates an oblique face 11 which is aligned with the face 9 of the first housing. These two oblique faces 9 and 11, separated by a spacing T, serve to guide a knife M (shown in broken line in FIG. 2) for cutting the packing strip. The housings 8 and 10 respectively mount rollers 12 and 12' on vertical axles for rotation. The movable housing 10 is provided with a clamping screw 13, for securely holding the housing in place on the plate 1. The tracks in which the housing 10 is free to move extend exactly parallel to the oblique surfaces 9 and 11 and comprise a slot 14, with key 15, and a groove 16 in the plate 1. A scale 17 in inches and millimeters, calibrated in strip thickness, indicates the size of the separation between the rollers 12 and 12'. The scale is so graduated, however, that the actual separation between the rollers is always approximately 10% less than that shown on the scale. For example, if the scale reads 10 mm., the actual roller reparation is 9 mm.

One of the rails 2 carries a scale 18 graduated in millimeters and the other rail a scale 18a graduated in inches. The slider 4 also carries an inch and a millimeter scale 19, the function of which will be presently explained. The two scales 18 and 18a are calibrated in diameters of the shafts and are so laid off on the rails that when the zero graduation of the scales 19 on the slider 4 is set opposite the shaft diameter as read off scale 18 or 18a, the distance X between the surface 6, on the one hand, and the face 9, on the other, is always exactly equal to the length of the circumference of the shaft of that diameter. Distance X is, of course, the minimum distance between surface 6 and face 9.

If the shaft diameter is assumed to be 30 mm. (as shown in FIG. 2), then the circumference is 94.2 mm. If it is further assumed that the diameter of the bore is 50 mm., then according to the formula $$\frac{\text{bore dia. minus shaft dia.}}{2} = \text{strip thickness}$$

the thickness is 10 mm.

It is known from experience that the length of the packing for a ring is obtained from the mean diameter between shaft and bore. In the present example, this is 30 mm. plus strip thickness: 30 mm.+10 mm.=40 mm. diameter. Thus, the length of the strip, or the circumference of the ring, is 125.6 mm. If the "zero" graduation of the slider 4 is set precisely opposite the "40" graduation of scale 18 (positions of slider and stop member being shown in dotted line, FIG. 2), and the strip A of packing material, 10 mm. thick with a suitably bevel-cut end, drawn along (without employing the rollers 12 and 12′) until the end is brought up against the surface 6, whereupon the knife M severs the strip along a line joining the faces 9 and 11, the length of the cut-off strip is 125.6 mm. Theoretically, the strip has the correct thickness, but it cannot be properly fitted into the stuffing space between the shaft and the bore, because the thickness of the strip is exactly equal to the clearance between shaft and bore. In practice, the length of the strip would be too short; and consequently, because of the gap between the ends of the ring, there would be no effective sealing. Thicker strips for the same or another shaft would give still worse results. The length of the strip therefore is not only dependent on the shaft diameter but also on the thickness of the strip. There is consequently a difference between the theoretically obtained value and the practical value, a difference which progressively increases with increasing strip thickness, and which therefore cannot be compensated simply by altering the scales 18 and 18′. Experience has also shown that this difference is affected by the various consequences attendant on compressing and stretching the strip while shaping it into a ring. Therefore, it is important that there be added to the theoretical length an "excess" which is suitable for, and increases with, the strip thickness. This is done using the scale 19 on the slider 4. In the end result, the value on scale 19 is added to that of scale 18 or 18a. To this end, the scale 19 of the slider 4 is a strip-thickness scale, but the graduated values of which are 4.01 times the actual strip thickness.

Continuing with the previous example—30 mm. shaft, 50 mm. bore, 10 mm. strip thickness—the practical length, as distinguished from the theoretical, is determined as follows:

(1) The "zero" graduation of scale 19 is set opposite the "30" graduation of scale 18 (FIG. 2), which yields, for the measurement range X, the exact length 94.2 mm. of the shaft circumference.

(2) The pointer 23a of the index mark 23 is aligned with the value "10" of scale 19.

(3) The slider 4 is again shifted leftwards, until the value "10" of scale 19 (in other words, the pointer 23a) is set opposite the value "30" of scale 18 (the left end of the slider being shown in dashed line in FIG. 2), whereby the necessary additional length of 40 mm. is added to the value of the shaft circumference, giving a final result of 134.2 mm. for the strip length which compensates for the strip thickness.

In operation, the housing 10 is set to the strip thickness on scale 17, the end of the commercially available pre-shaped sealing strip (10 mm. thick, square cross section, beveled end) brought up against the surface 6, and the strip severed by the knife M along a line connecting the surfaces 9 and 11. The resulting compensating length will produce a ring which has shown itself in actual use to be correct and highly effective. Of course, each time that a length is severed from the strip, the strip, before another length is cut from it, must be turned through 180° to obtain a bevel slanting in the correct direction.

In a simple sequence of steps, without waste or mistakes, and with only a very small inventory of commercially available strip thicknesses, the invention enables, systematically and economically, the quick production of uniform packing strips.

As explained previously, the separation between the rollers 12 and 12′ is approximately 10% undersize, which reduces, in the chosen example, the strip thickness to 9 mm. This reduction is important, because it enables the strip, now shaped into a ring, to be easily and satisfactorily inserted.

As a result of the precisely determined extra length of the strip and of the compression attending the shaping of the strip into a ring the thickness of the ring is 10 mm. when it is inserted.

A hardened flat spring 20, mounted on the plate 1, serves to guide the knife M and automatically to sharpen it, which latter feature is important, since the material of the packing is frequently tough.

As shown in FIG. 1, the invention can be installed on the cover 21 of a maintenance case 22. A suitable lengthening of the device of the invention for large shaft diameters is provided. A storage shelf and space 24, and depressions 25 for securely holding work tools, complete the usefulness of the case, which enables, for the first time, all sealing and stuffing problems to be simply and reliably dealt with on the spot.

The term "shaft" as used in the claims includes also rods, spindles, axles, and other moving parts for which a ring-shaped packing is suitable.

Although the preferred embodiment of the invention has been described, the scope of, and the breadth of protection afforded, the invention are limited solely by the appended claims.

I claim:

1. Device for cutting correctly to length packing strips, square in cross section, for packing rings, and for adjusting the thickness of the strip before it is shaped into a ring, wherein the improvement comprises a pathway along which the strip is drawn; a stop surface movable along said pathway and against which the strip end is set prior to severing, said stop surface extending oblique to said pathway; at least one first and at least one second cooperating scales for indicating, in dependence on the shaft diameter and the strip thickness, the correct compensating length of strip to be severed, said first and second scales cooperating with the position of said stop suface, and one of said scales being read off in accordance with the position of said stop surface; first and second rollers located on respective sides of said pathway and spaced therealong from said stop surface, said rollers adjusting the thickness of the strip; and cutting means for severing the strip along a line oblique to said pathway, said cutting means being located on said pathway intermediate said stop surface and said first and second rollers, whereby the minimum distance from said cutting means to said stop surface is equal, for the particular shaft diameter, to the circumference of the shaft plus an extra length which compensates for the strip thickness.

2. The device as defined in claim 1, wherein one of said first and second rollers is contained in a stationary housing and the other is contained in a movable housing and is movable therewith.

3. The device as defined in claim 2, including a support plate on which said device is mounted, and wherein each said housing incorporates a guide face for said cutting means, each said face being in alignment with the other and extending perpendicular to said support plate and oblique to said pathway.

4. The device as defined in claim 3, wherein said guide faces make an angle of approximately 101° with said pathway.

5. The device as defined in claim 4, wherein said stop surface makes an angle of approximately 101° with said pathway.

6. The device as defined in claim 5, wherein said angle made by said stop surface is the mirror image of said angle made by said guide faces.

7. The device as defined in claim 3, including tracks in said support plate for limiting movement of said movable housing to the direction parallel to the surface of said support plate and to said guide faces.

8. The device as defined in claim 1, including a slider mounting said stop surface, a track in which said slider moves, and wherein said first scale is calibrated in shaft diameters and is located alongside said track, and said second scale reads in strip thickness, is located on said slider, and runs parallel to said first scale, said two scales so cooperating that the value of said second scale adds to that of said first scale, whereby when the zero graduation of said second scale is set opposite the shaft diameter on said first scale said minimum distance equals the circumference of the shaft, and when the strip thickness on said second scale is set opposite the shaft diameter on said first scale said minimum distance equals the circumference of the shaft plus an additional length that compensates for the thickness of the strip.

9. The device as defined in claim 7, including a scale calibrated in strip thicknesses and cooperating with said movable block, whereby the latter can be set to provide the correct spacing between said first and second rollers for the thickness of the strip used, said scale being so calibrated that the actual separation between said first and second rollers is approximately 10% less than that shown on said scale, whereby the strip is reduced an equal percentage in thickness.

10. The device as defined in claim 1, wherein said device is built into a maintenance case.

11. The device as defined in claim 8, wherein the strip thicknesses calibrated on said second scale are equal to 4.01 times the actual strip thickness.

12. The device as defined in claim 8, including an index mark slidable along said slider in the direction of said second scale thereof and incorporating a pointer, for facilitating the setting of said slider with respect to said first scale.

13. The device as defined in claim 8, wherein the values of said second scale increase in a direction opposite to that in which those of said first scale increase.

References Cited
UNITED STATES PATENTS
1,745,815  2/1930  Schoepfle _____ 83—468

ANDREW R. JUHASZ, Primary Examiner

J. F. COAN, Assistant Examiner

U.S. Cl. X.R.

83—468, 522, 581; 100—168